Patented Nov. 8, 1938

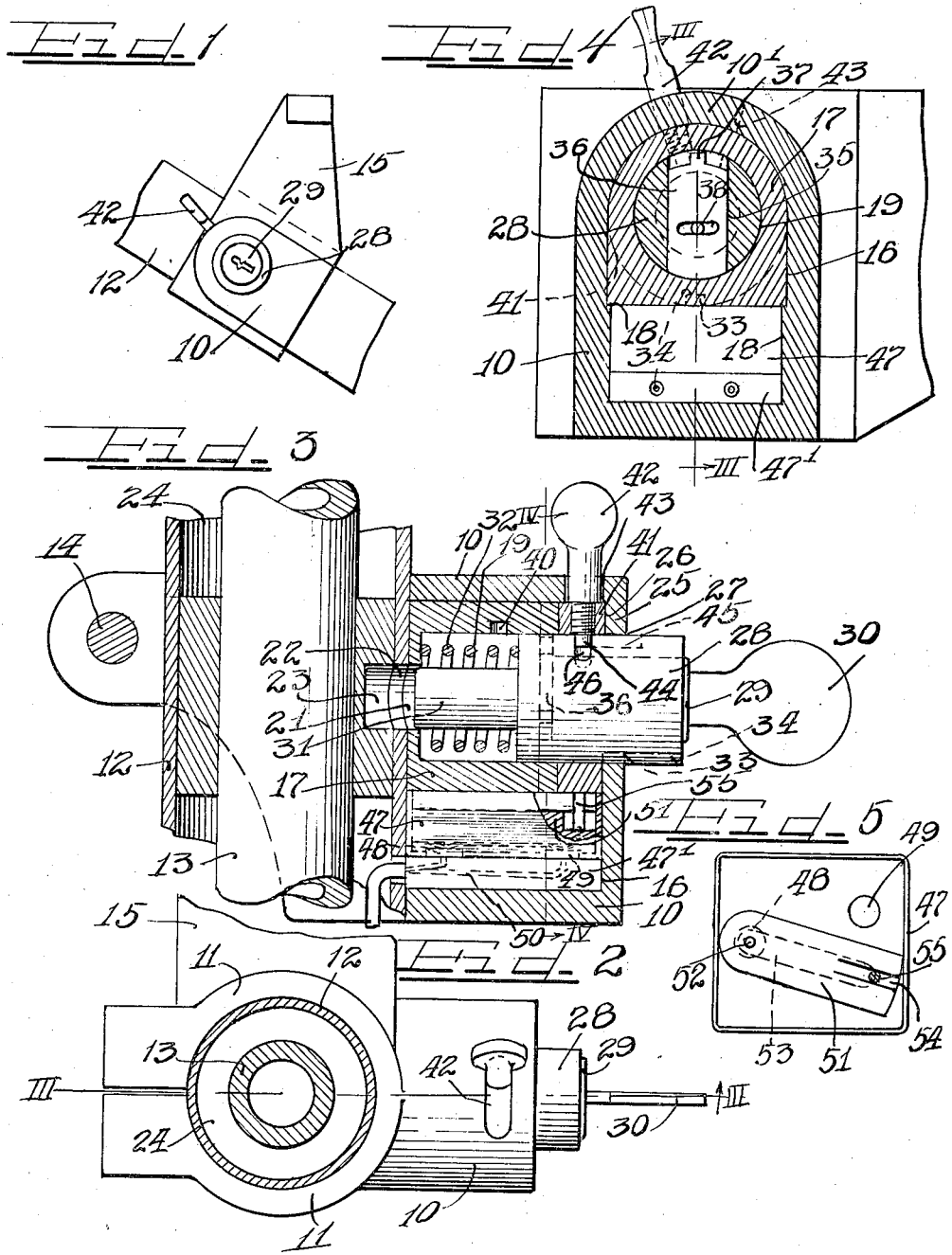

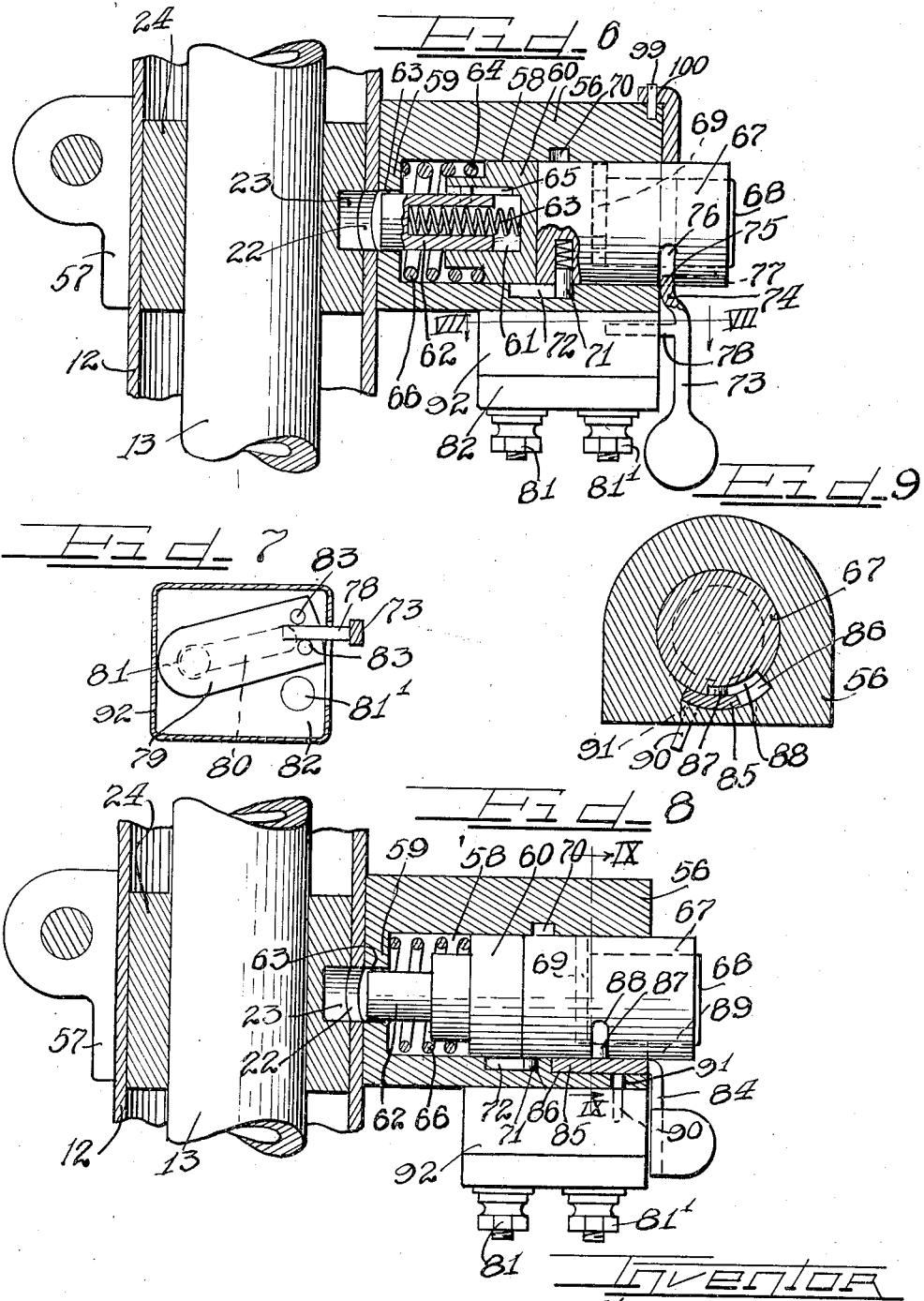

2,135,759

UNITED STATES PATENT OFFICE 2,135,759

AUTOMOBILE LOCK STRUCTURE

Alexander C. Mabee, Villa Park, Ill., assignor, by mesne assignments, to Houdaille-Hershey Corporation, Detroit, Mich., a corporation of Michigan Application June 3, 1936, Serial No. 83,181

1 Claim. (Cl. 70—252)

My invention relates to a lock structure adapted particularly for use on automotive vehicles for locking operation controls such as, for example, the steering and the ignition. The invention concerns particularly a two-stage or sequential operation type of lock with the first stage operation effecting unlocking or release of the steering and establishing operating condition for an ignition controlling switch, and the second stage operation effecting opening or closing of the ignition controlling switch.

An important object of the invention is to provide an arrangement comprising a lock bolt element and a key controlled lock element axially aligned and adapted for axial shift against the resistance of a spring for movement of the lock bolt element to steering locking position, with the lock element controllable by a key to permit the spring to shift the bolt element and lock element for unlocking of the steering and to establish the proper condition for switch operation to open or close the ignition circuit, and with the arrangement such that the switch must first be opened before the lock and bolt elements can be shifted back for relocking of the steering.

A further object of the invention is to provide a simple, economically manufactured and assembled lock structure which will be efficient in this operation.

Other features and advantages will be apparent from the following specification and the accompanying drawings, in which drawings:

Figure 1 is a side elevation of a lock structure mounted on a steering column;

Figure 2 is an enlarged plan view with the steering column structure in transverse section;

Figure 3 is a section on plane III—III Figure 2;

Figure 4 is a section on plane IV—IV Figure 3;

Figure 5 is an inner side view of a switch housing and switch therein;

Figure 6 is a view similar to Figure 3 showing a modified arrangement;

Figure 7 is a section on plane VII—VII Figure 6;

Figure 8 is a view similar to Figure 3 showing a further modified arrangement; and Figure 9 is a section on plane IX—IX Figure 8.

The lock structure shown in Figures 1 to 5 comprises a housing 10 from which extend the semi-cylindrical walls 11 for encircling the tube 12 which receives the steering shaft 13, the ends of the walls 11 being drawn together by a screw or bolt 14 so that the tube 12 is securely clamped. A wall 15 may extend rearwardly from the body structure and is adapted to be secured to a support as for example the instrument board of a vehicle so as to assist in securely holding the lock structure in proper position.

The lock body 10 may be of rectangular shape with a semi-cylindrical upper portion 10' and the body is hollow to provide a chamber 16.

In the upper part of the chamber 16 is a block 17 which may rest on shoulders 18, this block having a cylindrical bore 19 extending therein from its outer end. The inner wall 20 has an opening 21 concentric with the bore 19 and in register with the passageway 22 through the tube 12 and a notch 23 in a bushing 24 secured to the steering shaft 13.

The inner wall 20 of the block 17 abuts the tube 12 and the wall may be straight or may be curved to fit the curvature of the tube. The outer or open end of the bore 19 terminates a distance short of the outer wall 25 of the lock body 10 to leave a space 26, and the wall 25 has the cylindrical opening 27 concentric with the bore 19 and of the same diameter. Extending through the passage 27 and into the bore is the cylindrical casing 28 of a tumbler lock structure whose cylinder 29 is rotatable within the casing by means of a key 30. Extending inwardly from the lock casing integral therewith or otherwise fastened thereto is the locking plunger or bolt 31 which is in alignment with the passageways 21 and 22 and the locking notch 23 in the bushing 24 so that when the bolt extends through the passages and into the notch the steering shaft will be locked against turning. A spring 32 encircling the bolt between the wall 20 and the lock casing tends at all times to shift the lock casing with the bolt thereon outwardly and to resist inward movement thereof. The extent of outward movement is controlled by a tooth 33 on the wall 25 engaging in the longitudinally extending channel 34 along the outer portion of the lock casing. This tooth also prevents any rotational movement of the lock casing and locking plunger.

In the inner end of the lock casing 28 is a diametral extending guide passage 35 for a detent plate 36 having a tooth 37 at one end. An eccentric pin 38 at the inner end of the lock cylinder 29 engages in a transverse slot 39 in the detent plate. When the lock casing is pushed inwardly against the force of the spring 32 to move the locking plunger into the locking notch 23, the latch plate 36 will be in radial alignment with a hole 40 in the block 17 and when the key 30 is turned the eccentric pin 38 will shift the detent plate 36 for projection of its tooth 37 into the hole 40 so as to lock the lock casing and lock plunger in inner or steering locking position. When in such position, the key may be withdrawn from the lock cylinder. To unlock the steering the key is turned to withdraw the detent plate 36 so that the spring 32 may shift the lock casing and lock plunger outwardly clear of the locking notch 23, the lock casing coming to rest when the inner end of its channel 34 meets the abutment tooth 33.

Within the space 26 between the block 17 and the outer wall 25 of the lock body is a ring 41 which has bearing on the lock casing 28 and at certain times is rotatable thereon. The ring has an operating handle 42 which is projected through the opening 43 in the body 10 and has threaded engagement in the ring, the passageway 43 being elongated to afford sufficient clearance for the handle for rotation thereby of the ring. At its inner end the handle 42 has a lug 44 for cooperation with an L-shaped channel in the lock casing which channel comprises a longitudinally extending leg 45 and a circumferentially extending leg 46. As shown in Figure 3, the lug 44 is at the inner end of the longitudinal leg 45 and in register with the circumferential leg 46 when the lock casing and lock plunger are in outer or steering unlocking position and the handle 42 may therefore be swung for rotation of the ring 41 which, as will be presently described, controls the operation of a switch. When the handle is swung for positioning of its lug 44 at the inner end of the longitudinal leg 45 and the lock casing is then shifted inwardly to steering locking position, the outer portion of the longitudinal channel 45 will receive the lug 44 and will hold the handle 42 against movement.

Within the bottom of the chamber 16 in the lock body is a switch structure comprising a sheet metal box or housing 47 and a cover 47' therefor of insulating material, which cover supports switch contacts 48 and 49 with which connect electrical conductors 50 which may form part of an ignition circuit. Within the housing is a block 51 of insulating material pivoted at one end by a pin 52 concentric with the terminal 48, the block supporting a switch blade 53 in permanent electrical engagement at one end with the terminal 48 and with its other end adapted for electrical engagement with the terminal 49 when the switch block is swung. In its upper side, the switch block has a longitudinally extending slot 54 near its outer end for receiving the end of a pin 55 extending downwardly into the housing from the ring 41 to which it is secured. As shown on Figure 3, the lock casing and plunger are in retracted position to unlock the steering, and the handle 42 is free to be swung forwardly for passage of its lug through the circumferential channel 46 in the lock casing, and with such forward swing the ring 41 will be rotated and the pin 55 carried therewith to swing the switch block 51 from the switch open position shown in Figure 5 to switch closed position in which the switch blade 53 will be in engagement with the channel 49 to close the ignition circuit. While the lock casing and plunger are in retracted position, the handle 42 may be swung back and forth for opening or closing of the ignition circuit, but when the handle has been swung forwardly for closure of the circuit, the engagement of the lug 44 in the circumferential channel 46 in the lock casing will prevent inward shift of the lock casing so that while the ignition circuit is closed the steering cannot be locked. Before such steering locking can be accomplished the handle 42 must be swung back to bring its lug 44 into alignment with the longitudinal channel 45 in the lock casing, after opening of the switch, so that only then can the lock casing be shifted inwardly to project the lock plunger for locking of the steering. Thus during the first stage of operation of the lock structure the key is turned for releasing the lock casing and lock plunger for shift by the spring 32 to outer or steering unlocking position and establishing operative condition for the switch controlling handle or lever 42, while during the second stage of operation the handle may be swung for opening or closing of the switch. To reestablish steering locking, the switch must first be restored to open position and then the lock casing may be shifted inwardly to project the lock plunger into the notch 23 and the key in then turned to engage the latch tooth 37 with the hole 40, and the key may then be withdrawn.

In the modified arrangement shown in Figures 6 and 7, the lock body 56 has the arms 57 encircling and clamped around the tube 12 surrounding the steering shaft 13. The body has a cylindrical bore 58 extending therethrough from its outer end to within a short distance of its inner end to leave a wall 59 having the opening 63 in register with the passageway 22 through the tube 12 and the locking notch 23 in the bushing 24 secured to the steering shaft. Within the inner portion of the bore 58 is the lock bolt structure comprising the cylindrical body 60 having the bore 61 for the locking plunger 62 yieldably urged outwardly by a spring 63 but having its outward movement limited by the engagement of a pin 64 thereon in a channel 65 in the body 60. The lock plunger is adapted to extend through the opening 63 in the wall 59 and through the passage 22 and into the notch 23 for locking of the steering. A spring 66 between the wall 59 and the body 60 tends to shift the lock bolt structure outwardly to steering unlocking position.

In the outer portion of the bore 58 is the cylindrical casing 67 of a tumbler lock structure, the key operable lock cylinder 68 being within the outer portion of the casing. When the lock casing is shifted inwardly against the resistance of the spring 62, the lock bolt structure will be correspondingly shifted for projection of the lock plunger into the notch 23 for locking of the steering and, when shifted to this position, turning of the key will project the detent plate 69 into the hole 70 for locking the casing and the lock bolt structure in inner or steering locking position. When the key is turned to withdraw the detent plate, the spring 66 will shift the lock bolt structure and the casing outwardly to steering unlocking position, the outward movement of the casing being limited by the engagement of a spring pressed detent pin 71 in a channel 72, the pin being shown as carried by the lock casing and the channel being shown as being in the lock body 56.

The switch lever 73 is shown outside of the lock body and has a hub 74 by which the lever is rotatable on the lock casing. The hub has a tooth 75 cooperating with an L-shaped channel in the lock casing, which channel comprises the circumferentially extending leg 76 and the longitudinally extending leg 77. The lever structure is held from axial displacement by a pin 99 on the body 56 engaging in a slot 100 in the lever structure.

An arm 78 extends laterally from the lever 73 into a switch housing 92 for moving the switch block 79. This switch block is pivoted at one end for engagement of the corresponding end of the switch blade 80 with a circuit terminal 81 mounted on the cover 82 for the switch housing, the free end of the switch blade being adapted for engagement with the other terminal 81', and these terminals may be connected with the ignition circuit. As shown, the switch arm 78 extends between two abutment pins 83 on the switch block so that when the lever is swung the switch block will also be swung for opening or closing the ignition circuit.

When the lock bolt structure and the lock casing are in their outer or steering unlocking position as shown in Figure 6, the lever tooth 75 will be in registration with the circumferential leg 76 of the L-slot and the lever may be swung for opening or closing the switch. Only after the lever has been swung to open the switch and bring the tooth 75 into registration with the longitudinal leg 77 of the L-slot can the lock casing be pushed inwardly for shifting of the lock bolt structure to lock the steering, and as soon as the tooth 75 is within the longitudinal leg 77 the lever will be held against movement so that the switch cannot be opened, and such holding of the lever will be maintained so long as the lock casing is in its innermost position and is locked in such position by the projection of the detent plate 69 of the hole 70.

Figures 8 and 9 show substantially the same structure and arrangement as in Figures 6 and 7 except that the switch operating lever is differently located. The lever 84 extends from an arcuate plate 85 movable within a recess 86 in the lock body and extending circumferentially relative to the lock casing 67. A pin 87 on the plate 85 cooperates with the L-channel in the lock casing comprising the circumferential leg 88 and the longitudinal leg 89. A switch actuating pin 90 extends downwardly from the plate 85 and through an opening 91 in the lock body and into the switch housing 92 for engagement with the switch block therein. Figure 8 shows the lock bolt structure and lock casing shifted outwardly by the spring 66 with the stop pin 71 against the outer end of the channel 72, and in this position the pin 87 is in alignment with the circumferential leg 88 of the L-channel so that the lever 84 may be swung for opening and closing of the switch. Only after opening of the switch and alignment of the pin 87 with the longitudinal leg 89 of the channel can the lock casing be pushed inwardly for resetting of the lock bolt structure for steering locking position. After such inward shift, the detent plate 69 will be turned by the key to engage in the hole 70 to lock the parts in steering locking position and the pin 87 on the switch lever structure will then be within the longitudinal leg 89 of the L-channel and the switch will remain locked against any actuation.

In the arrangement of Figures 6 and 8, the lock bolt structure comprising the body 60 and the lock plunger 62 is a structure separate from the lock casing 67, while in the arrangement of Figures 1 to 5, the lock bolt or plunger 31 is a part of the lock casing.

I have shown practical and efficient embodiments of the various features of my invention but I do not desire to be limited to the exact construction and arrangement or operation shown and described as changes and modifications may be made without departing from the scope of the invention.

I claim as my invention:

In a two-stage lock structure for locking the steering and the ignition of automotive vehicles, a first locking means comprising an axially shiftable and non-rotatable elongated lock casing provided with a lock bolt secured thereto, spring means tending to shift said casing axially for unlocking of the steering by said bolt, holding means controlled from within said lock casing for normally holding said bolt for locking of the steering, a switch actuating element arranged axially immovable but rotatable in a direction concentric to the longitudinal axis of said casing, means on said casing operable upon axial movement of said casing relative to said switch actuating element to lock said switch actuating element against rotation when said steering is locked and to permit rotation of said switch actuating element when the steering is unlocked.

ALEXANDER C. MABEE.